United States Patent
Johansen

[19]

[11] Patent Number: 5,967,541
[45] Date of Patent: Oct. 19, 1999

[54] TOWING HEAD

[75] Inventor: Hans Simon Johansen, Bryne, Norway

[73] Assignee: Stanley Aviation Corporation, Aurora, Colo.

[21] Appl. No.: 08/906,530

[22] Filed: Aug. 5, 1997

[51] Int. Cl.⁶ .................................................. B60D 1/01
[52] U.S. Cl. ........................ 280/504; 280/493; 280/508; 280/515; 280/904; 292/126; 292/217; 292/226
[58] Field of Search .................................. 280/493, 504, 280/508, 510, 514, 515, 509; 180/904; 292/126, 217, 226

[56] References Cited

U.S. PATENT DOCUMENTS

| | | | |
|---|---|---|---|
| Re. 14,582 | 1/1919 | Cadman. | |
| 524,960 | 8/1894 | Stadtmuller | 280/509 |
| 774,903 | 11/1904 | Ammann | 280/508 |
| 788,692 | 5/1905 | Ammannn | 280/509 |
| 1,342,593 | 6/1920 | Orr. | |
| 1,398,547 | 11/1921 | Graham | 280/504 |
| 1,419,398 | 6/1922 | Mason. | |
| 1,824,843 | 9/1931 | Staley | 280/504 |
| 2,426,532 | 8/1947 | Tierney | 280/504 |
| 2,468,669 | 4/1949 | Holmes | 280/33.14 |
| 2,475,780 | 7/1949 | Fearnehough | 280/33.17 |
| 2,665,128 | 1/1954 | Guffey | 267/71 |
| 2,998,268 | 8/1961 | Witter | 280/506 |
| 3,404,901 | 10/1968 | Rau | 280/504 |
| 3,580,612 | 5/1971 | Pearson | 280/492 |
| 3,709,522 | 1/1973 | Olson | 180/904 |
| 3,868,128 | 2/1975 | Mahieu | 280/453 |
| 3,955,832 | 5/1976 | Kalmanson | 280/476 R |
| 4,002,352 | 1/1977 | Hager | 280/408 |
| 4,418,936 | 12/1983 | Adams et al. | 280/493 |
| 4,426,098 | 1/1984 | Kalmanson | 280/504 |
| 4,958,848 | 9/1990 | Nash | 280/508 |
| 5,078,418 | 1/1992 | Kalmanson | 280/506 |
| 5,129,667 | 7/1992 | Gratton | 280/493 |

FOREIGN PATENT DOCUMENTS

| | | | |
|---|---|---|---|
| 472034 | 3/1951 | Canada. | |
| 632969 | 1/1928 | France | 280/508 |
| 2902407 | 7/1979 | Germany | 280/508 |
| 3705740 A1 | 10/1987 | Germany. | |
| 8801287 | 12/1989 | Netherlands. | |
| 2050977 | 1/1981 | United Kingdom. | |

*Primary Examiner*—Daniel G. DePumpo
*Attorney, Agent, or Firm*—Fields and Johnson, P.C.

[57] ABSTRACT

A towing head is provided including three primary members. The first member is stationary and includes a channel which receives the tow pin or towing fitting of an aircraft. The second member pivotally attaches to the first member and itself includes a channel which communicates with the channel of the first member. The third member rotatably attaches to the second member and includes a handle for which to place the towing head in either a locked, partially locked, or unlocked position. In the unlocked position, the second member is moved away from interfering with the channel of the first member so that the tow pin or fitting may be freely inserted or removed from within the channel of the first member. In the locked position, the second member is moved to a position so that it interferes with the channel of the first member and prevents the tow pin from being removed from the towing head. The second member may be moved to a partially locked position prior to engaging the tow pin with the towing head which enables an operator to release the towing head once the tow pin engages the towing head because the towing head, while in the partially locked position, can secure the tow pin without locking.

21 Claims, 3 Drawing Sheets

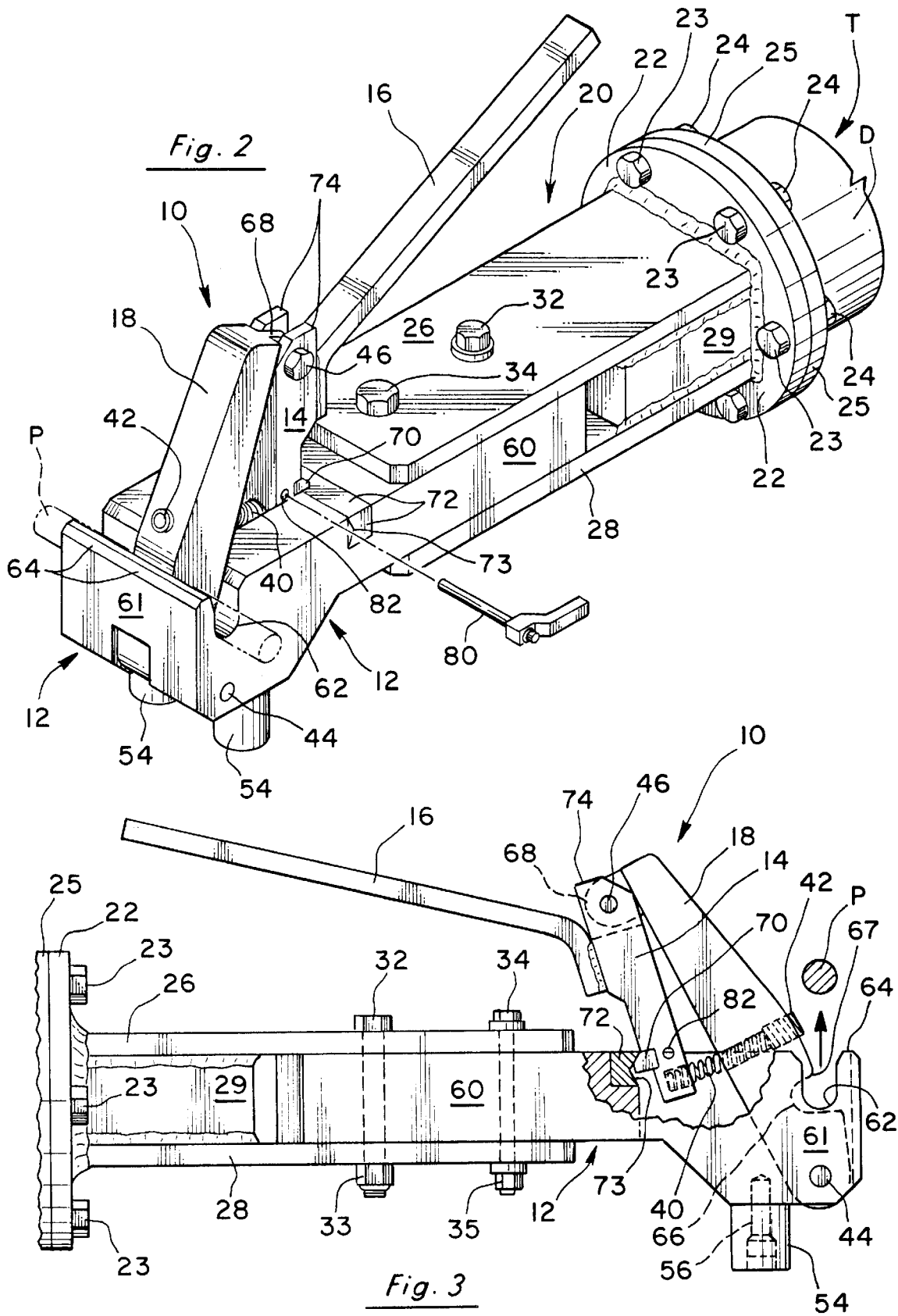

TOWING HEAD

TECHNICAL FIELD

This invention relates to a device used for connecting two objects to one another, and more particularly, to a towing head which enables a safe and efficient connection between a tow bar assembly attached to a ground vehicle and an aircraft.

BACKGROUND ART

In recent years, the increased volume of air traffic in most airports has required airport ground personnel to more efficiently handle the increased traffic. One common ground activity which occurs at every airport is the movement of parked aircraft to different locations around the airport airfield by ground vehicles. For example, once an aircraft has landed and is parked, the aircraft may later need to be moved to another location. In this circumstance, ground equipment is used to move the aircraft in lieu of the aircraft moving under its own power. One critical step in the movement of aircraft by ground vehicles is the connection of the ground vehicle to the aircraft. A number of prior art devices exist which are intended to be used to couple a ground vehicle to an aircraft such as by a tow bar assembly.

U.S. Pat. No. 4,426,098 and U.S. Pat. No. 5,078,418 to Kalmanson each disclose a towing head characterized by a connecting structure including a rotatable cam that is selectively positionable into a locked or unlocked position by camming engagement of the rotatable cam with the tow pin of the aircraft. The rotation of the cam to the locked position causes the tow pin of the aircraft to be securely clamped between the connecting structure that may take the form of one or more hook members.

U.S. Pat. No. 4,418,936 to Adams, et al. discloses a tow bar coupling head which may be attached to the tow pin of an aircraft. The structure of this device includes a solid metal body portion with a transverse slot formed on its underside and within which the tow pin of the aircraft is received. A dead bolt slide lock retains the aircraft pin in place within the slot. A removable locking pin extending vertically through the body portion prevents accidental withdrawal of the dead bolt slide lock by use of a spring member to bias the slide lock in a closed position.

German Patent No. 3,705,740A1 discloses a tow bar assembly for connection to an aircraft in order to tow the same. The structure of this device incorporates two outer plates and a third plate positioned between the outer two plates. A sheer pin connects the two outer plates and is located in a cylindrical sleeve through the third plate. A rotatable handle member pivotally connected to the main body portion of the tow bar assembly is used to positively engage the tow pin of the aircraft.

The foregoing inventions are suitable for their intended purposes. However, each of the foregoing references require undue manual intervention in creating an initial connection between the aircraft and the tow bar assembly. This manual intervention first requires a holding step in that the tow bar assembly must first be held in alignment with the tow pin on the wheel assembly of the aircraft, and then requires a separate locking step to positively connect the tow bar assembly to the tow pin. For example, in the Kalmanson references, the tow bar assembly must first be held in alignment with the tow pin and then, while the tow bar assembly is held in a steady aligned position, the lever-type cam handle must be rotated in the desired direction in order to positively engage the towing head assembly with the tow pin. In both Adams, et al., and the German patent, two separate steps are required in the initial connection by first aligning the tow bar assembly and then rotating or pushing the handle member in a desired direction. Because of the weight and bulk of many tow bar assemblies, the mere manipulation of a handle while having to simultaneously hold the tow bar assembly in the aligned position can make it difficult to achieve a quick and secure connection.

In addition to the above-mentioned shortcomings, many of the prior art devices are structurally complex, difficult to maintain, and may be expensive to purchase.

SUMMARY OF THE INVENTION

In accordance with the present invention, a towing head is provided. In its simplest form, the towing head includes a first member or head block including a channel for receiving a tow pin of an aircraft. The towing head further includes a second member or clamp block having its own channel which communicates and intersects with the channel of the first member or head block. The second member or clamp block is pivotably attached to the first member. A third member or pivot block is rotatably attached to the second member in order to selectively lock or unlock the towing head to the tow pin. The tow pin of the aircraft may be engaged by simply positioning the towing head below the tow pin and then lifting the towing head so that the impact of the tow pin against the first and second members overcomes a biasing force of a spring which connects between the second and third member and results in placement of the tow pin within the intersecting channels of the first and second members. Once this spring force is overcome, an initial connection is made between the towing head and the tow pin without having to manipulate a lever, handle, or the like. The towing head is then locked to the tow pin of the aircraft by lifting up on a handle attached to the third member and inserting a locking pin through a locking pin opening formed through the third member.

Because the initial connection may be made between the aircraft tow pin and towing head without having to manipulate some lever or handle member or having to maintain a steady alignment between the tow pin and towing head, the towing head of this invention is more efficiently and safely attached to the tow pin of the aircraft. In other words, the towing head is simply snapped into engagement with the tow pin of the aircraft without having to simultaneously manipulate some structure on the towing head while the towing head is maintained in an aligned position with the tow pin.

In addition to the simplicity and safety with which the initial connection is achieved, the structure of this invention is very simple and inexpensive to maintain.

Additional advantages of this invention will become apparent from the description which follows, taken in conjunction with the accompanying drawings.

BRIEF DESCRIPTION OF THE DRAWINGS

FIG. 2 is an enlarged perspective view of the towing head of this invention illustrating a locking pin shown in its withdrawn position and the tow pin of an aircraft engaged with the towing head;

FIG. 3 is a side elevation view of the towing head of FIG. 2, showing a portion of the towing head broken away in order to view some of the interior structural details of the towing head and further illustrates the tow pin prior to making contact with the clamp block and head block;

BEST MODE FOR CARRYING OUT THE INVENTION

Figure 1:
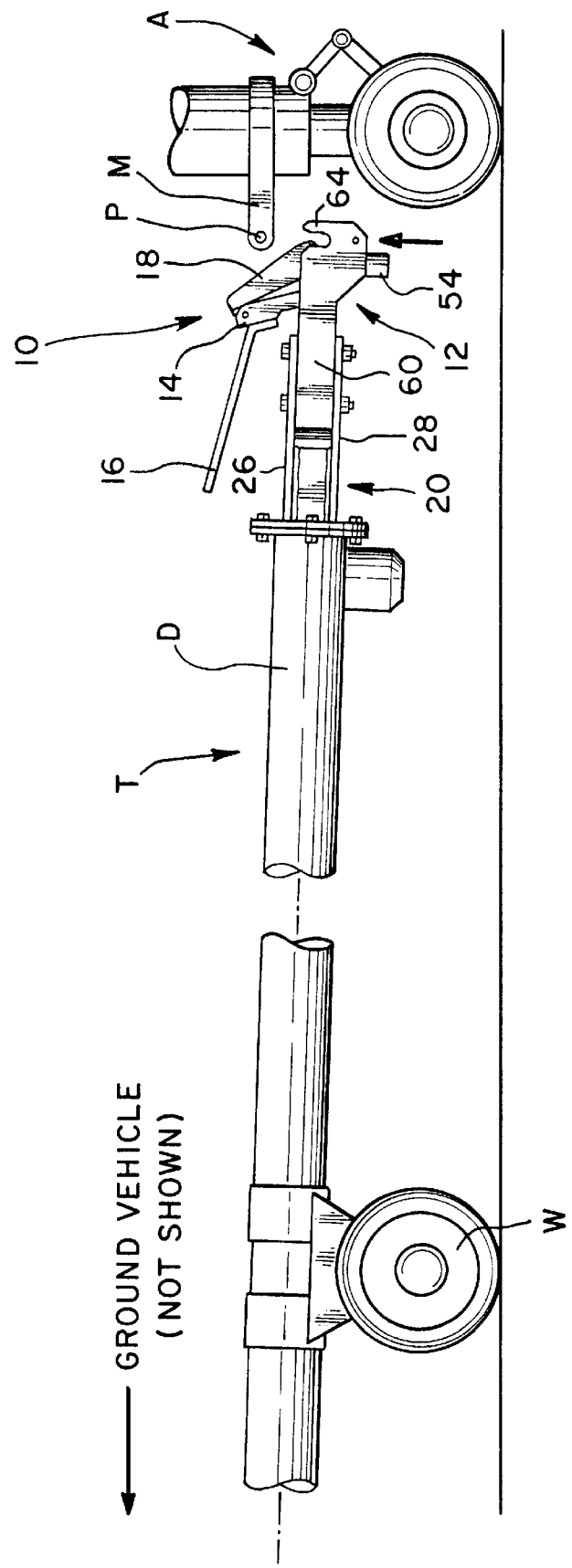
FIG. 1 is a fragmentary side elevation view of a tow bar assembly including the towing head of this invention which is shown directly adjacent to a tow pin of an aircraft wheel assembly.

As shown in FIGS. 1 and 2, the towing head 10 is the device by which a connection is made between a tow pin P and a tow bar assembly T which attaches to a ground vehicle (not shown). As shown in FIG. 1, a common tow bar assembly T may include a draw bar D which is mounted upon one or more wheels W. One end of the draw bar D may include a towing pintle (not shown) for connection to the ground vehicle which tows the aircraft. The opposite end of the tow bar assembly includes the towing head 10 of this invention. The side elevation view of FIG. 1 shows only one wheel W; however, a plan or perspective view would illustrate that the particular tow bar assembly T has two wheels, each one positioned on opposite sides of the draw bar D. The towing head 10 connects to the aircraft wheel assembly A which has mounted thereto a tow pin mount M including the tow pin P.

The towing head 10 includes three primary members. The first member or head block 12 is a solid and elongate structure which is adapted to receive the two remaining primary members of the invention, namely, the clamp block or second member 18, and the pivot block or third member 14. The head block can preferably be made of a high carbon steel such as AISI type 4340. The clamp block and pivot block are also preferably made of a high carbon steel such as AISI type 4130.

As best seen in FIGS. 2 and 3, the head assembly 10 attaches to the draw bar flange 25 of the draw bar D by means of an intermediate structure, namely the adapter assembly 20. As shown, adapter assembly 20 includes an adapter flange 22 which abuts draw bar flange 25 and is held against flange 25 by a plurality of bolts 23 and corresponding nuts 24. Adapter assembly 20 further includes an upper mounting plate 26 and a lower mounting plate 28 which are supported in parallel spaced relation by support block 29. The proximal end of head block 12 is inserted in the space between the distal ends of upper mounting plate 26 and lower mounting plate 28. The head block 12 is secured to the adapter assembly 20 by means of retaining bolt 32 and corresponding nut 33, and sheer bolt 34 and corresponding nut 35. As understood by those skilled in the art, the retaining bolt 32 is made of high strength material while sheer bolt 34 is made of a lesser strength material so that sheer bolt 34 will sheer or break in the event undue stress is placed upon the tow bar assembly while connected to an aircraft.

As shown in FIGS. 3–6, clamp block 18 pivotally attaches to head block 12 by means of pivot pin 44 which is inserted through a bore drilled through the distal lower end of head block 12 and an aligned bore drilled through the lower end of clamp block 18. The upper portion of clamp block 18 connects to pivot block 14 by means of bolt 46 as further explained below.

The lower end of pivot block 14 includes a well or cavity to receive one end of spring 40. The other end of spring 40 is inserted through a bore drilled through the middle portion of clamp block 18. Set screw 42 covers the bore opening in clamp block 18 and enables one to adjust the compression of spring 40 by moving the location of set screw 42 deeper or shallower within the bore formed through the middle portion of clamp block 18.

The lower surface of the distal end of head block 12 may include a bumper 54 attached thereto by retainer bolt 56. Bumper 54 enables the towing head to be placed on the ground when not in use without damage. If the towing head 10 is inadvertently dropped or mishandled, the bumper 54 will absorb the shock of impact of the towing head against the ground. Bumper 54 may be constructed of any well-known synthetic rubber or other material which is resilient to a striking force.

The specific structure of the head assembly 10 will now be discussed in more detail as the towing head is used in operation. As illustrated in FIGS. 3–6, the head block 12 may be characterized by a rectangular shaped proximal portion 60 which fits between upper and lower mounting plates 26 and 28 respectively. The distal portion 61 of the head block 12 may be configured to include a U-shaped channel or slot 62 resulting in the formation of lip 64. The channel or slot 62 is adapted to receive a cylindrical object such as a standard tow pin P or other cylindrical shaped object. Although channel 62 is illustrated as conforming to the shape of a cylindrical object, it will be understood by those skilled in the art that the specific shape of channel or slot 62 may be modified to accept whatever type of tow pin or tow fitting which may come equipped on a particular type of aircraft.

Clamp block 18 is best described as an elongate member which protrudes in a perpendicular fashion above the upper surface of head block 12 and whose primary purpose is to adjustably lock the tow pin P of the aircraft to the towing head. As shown, clamp block 18 includes its own U-shape channel or slot 66 which is alignable with channel 62 of head block 12 to form a common pin receiving opening. As best seen in FIG. 3, lip 67 is defined as the protruding edge of clamp block 18 which most greatly overlaps or interferes with channel 62. Depending upon the positioning of clamp block 18, the tow pin P of the aircraft is either free to be inserted or removed from channel 62, or is captured within the intersection of channels 62 and 66 by the interference of clamp block 18 within the upper portion of channel 62. The upper end of clamp block 18 includes protruding flange 68 and an opening formed through the flange 68 in order to receive bolt 46.

Pivot block 14 is also an elongate member which protrudes in a perpendicular fashion above the upper surface of head block 12, and connects to clamp block 18 by means of spaced forks 74 which are adapted to receive bolt 46. The upper end of pivot block 14 includes handle 16 which can be used to place the towing head in a locked, partially locked, or unlocked position, as further explained below.

Head block 12 further includes a transverse slot which receives receiving member 72. Receiving member 72 is a rectangular piece having a V-shaped groove 73 formed on one side. This V-shaped groove 73 lies in abutting relationship with engaging stop 70 which is attached to pivot block 14. Depending upon the amount of wear experienced, engaging stop 70 and receiving member 72 may be replaced when appropriate. The stop 70 and receiving member 72 are preferably made of austenetic stainless steel type 17-4.

Figure 6:
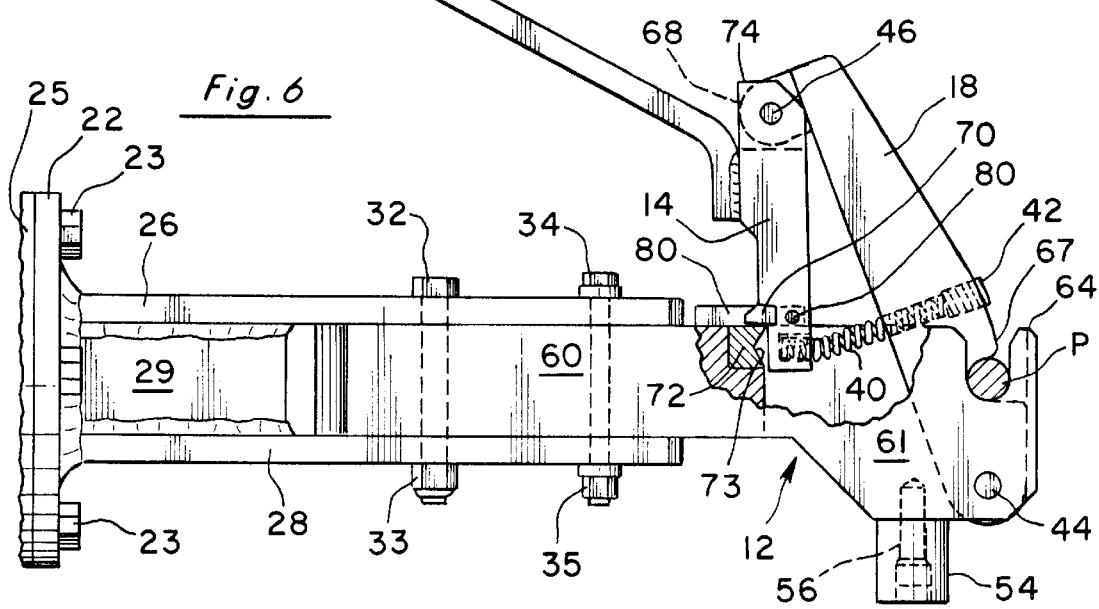
FIG. 6 is another side elevation view, similar to FIGS. 3–5, showing the tow pin as it is fully seated within the channels of the head block and clamp block, and further illustrating the pivot block placed in a position to lock the towing head to the tow pin.

Pivot block 14 further includes pin opening 82 which may be formed by drilling through the pivot block. Pin opening 82 receives locking pin 80 when the towing head is placed in the locked position. As best seen in FIGS. 2 and 6, the insertion of locking pin 80 into opening 82 prevents any downward travel of engaging stop 70 against V-shaped groove 73.

Figure 4:
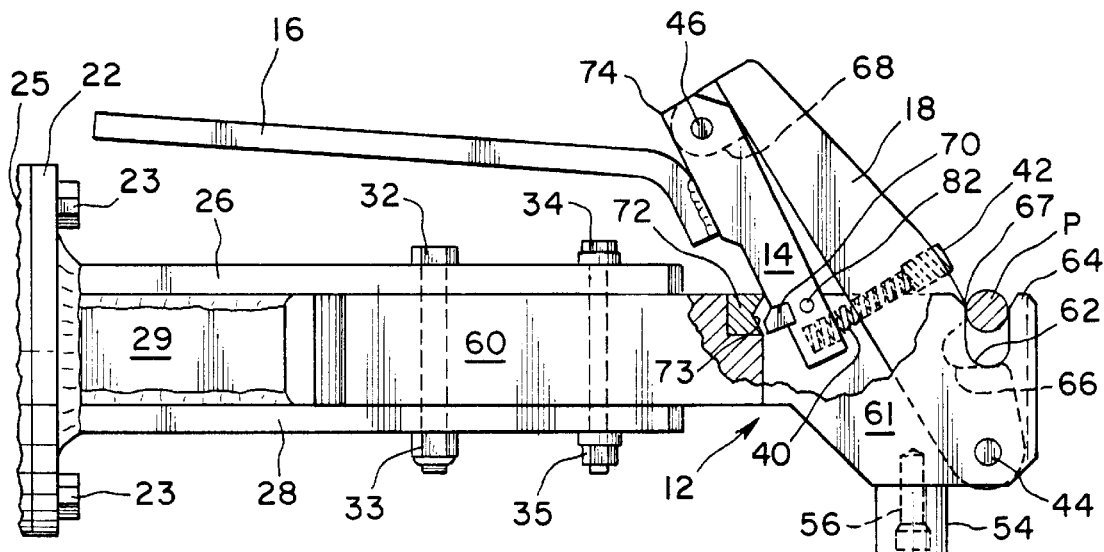
FIG. 4 is a side elevation view, as shown in FIG. 3, illustrating the tow pin as it first makes contact with the clamp block and head block.
Figure 5:
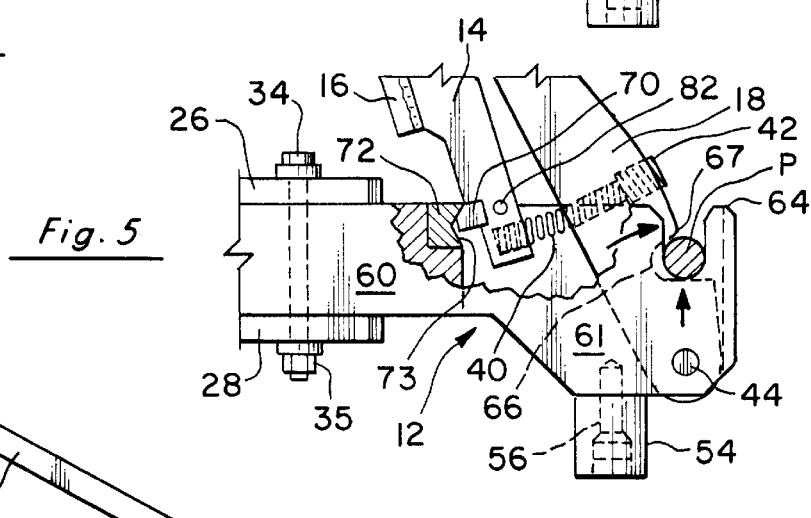
FIG. 5 is a fragmentary side elevation view, similar to FIGS. 3 and 4, illustrating the tow pin as it is fully seated within the channel of the head block and partially seated within the channel of the clamp block.

The operation of the head assembly will now be described in sequential order with respect to FIGS. 3–6. As shown in FIG. 3, the towing head 10 is first located so that channel 62 is directly below tow pin P. The towing head 10 is also initially placed in the partially locked position, as further discussed below, prior to receiving the tow pin P. In one sharp upward thrust, the towing head 10 is lifted so that tow pin P makes contact with lip 64 of head block 12 and lip 67 of clamp block 18 as shown in FIG. 4. The upward thrust of the towing head 10 against tow pin P must be great enough to overcome the force induced on clamp block 18 by spring 40. If this force is overcome, tow pin P will initially reside fully within channel 62 and partially within channel 66. This first engaging position is shown in FIG. 5 and defines the partially locked position. As shown in FIG. 4, when the tow pin P makes initial contact with lips 64 and 67, engaging stop 70 is forced downwardly and out of its mating engagement with V-shape groove 73 as clamp block 18 rotates in a counterclockwise direction about pin 44. Once the tow pin P is fully seated within channel 62, as shown in FIG. 5, engaging stop 70 returns to its mating engagement with V-shaped groove 73. In the partially locked position, illustrated in FIG. 5, the operator no longer has to hold the tow bar. Thus, the initial engagement or connection with the tow pin can be achieved simply by a sharp upward thrust of the towing head against the tow pin P. If it is desired to lock the towing head to the aircraft, handle 16 is lifted in an upward direction to force engaging stop 70 out of V-shape groove 73 and above the upper surface of the head block 12. The positioning of engaging stop 70 above the upper surface of head block 12 is illustrated in FIG. 6 and defines the fully locked position. Simultaneous with this positioning of engaging stop 70, as shown in FIG. 6, clamp block 18 is forced in a distal direction to fully seat tow pin P within channel 66. Then, locking pin 80 may be inserted through pin opening 82 as a safety measure to ensure that the head assembly is maintained in the fully locked position.

If it is desired to disengage the tow pin from the towing head, locking pin 80 is removed from within pin opening 82 and handle 16 is pressed in a downward manner to the position shown in FIG. 4 so that the tow pin may have a clear path or opening to travel out of channels 62 and 66. The pressing of handle 16 to create the clear path or opening as shown in FIG. 4 defines the fully open position.

The spring force urging clamp block 18 in a distal direction can be adjusted by set screw 42 which varies the compression of the spring 40. Therefore, the amount of force necessary to place the tow pin in the partially locked position, as shown in FIG. 5, can be varied as desired.

Although channel 66 is illustrated as having a particular shape so to properly intersect with channel 62, the shape of channel 66 may also be altered to conform to the particular shape of the tow pin or tow fitting utilized by a particular aircraft.

In summary, the positioning of the towing head with respect to the tow pin P can best be described in three distinct positions.

The first position is shown in FIG. 5 and can be described as the partially locked position wherein the tow pin may be inserted fully within channel 62 and partially within channel 66 by overcoming a biasing force placed on clamp block 18 by spring 40. It is, of course, desirable to set the spring so that the weight of the tow bar assembly itself will not overcome the biasing force of the spring which prevents the towing head from releasing the tow bar. In this partially locked position, the tow pin P may also be removed from within channels 62 and 66 by overcoming the biasing force of the spring 40.

The second position is the locked position illustrated in FIG. 6 wherein the handle 16 is pushed upwardly so that clamp block 18 is moved to a fully distal position and engaging stop 70 is removed from mating engagement with V-shape groove 73 so that stop 70 resides above the upper surface of head block 12.

The third position is shown in FIG. 4 and is described as the unlocked position wherein the tow pin is free to be inserted or removed from within the opening or path formed by channels 62 and 66.

From the foregoing, it is apparent that the towing head of this invention enables ground personnel to more efficiently connect tow bar assemblies to aircraft. The initial connection is made simply by an upward thrust which eliminates the need to hold the tow bar assembly for an extended period of time. Once the initial connection has been made, the operator no longer must maintain the tow bar assembly in an aligned position. The final locking step is then achieved by simply lifting the handle. With the prior art, the final locking step had to be conducted simultaneously with the step of holding or maintaining the tow bar assembly in an aligned position.

Although this invention offers an efficient manner by which a connection can be made between a vehicle and tow bar assembly, the structure incorporated in the invention is simple and can be manufactured at a minimum cost. Furthermore, since there are a minimum number of moving parts or other elements otherwise subject to repeated stress, this invention can be easily maintained.

This invention has been described in detail with reference to a particular embodiment thereof, but it will be understood that various other modifications can be effected within the spirit and scope of this invention.

What is claimed is:

1. A towing head for attachment to a tow pin on a wheel assembly of a vehicle, said towing head comprising:
    a first member including a channel formed thereon;
    a second member pivotally attached to said first member and having a channel formed thereon;
    a third member pivotally attached to said second member, said second member being positionable with respect to said first member in either a first position wherein said channels form a common opening through which the tow pin may pass, or being positionable in a second position wherein said second member interferes with said opening to block removal of the tow bar from within said opening and said third member is positioned with respect to said first member to lock the tow pin to said towing head; and
    a spring interconnecting said second and third members, said spring urging said second member to interfere with said opening and urging said second and third members apart from one another.

2. A towing head, as claimed in claim 1, further including:
    an engaging stop attached to said third member for selective engagement with said first member to lock the tow pin in said channels.

3. A towing head, as claimed in claim 1, further including:
an adjustment screw communicating with said spring to enable the force of said spring to be adjusted.

4. A towing head, as claimed in claim 2, further including:
a handle connected to said third member enabling said engaging stop to be brought into and out of selective engagement with said first member by manipulating said handle.

5. A towing head, as claimed in claim 2, further including:
a receiving member including a groove for receiving said engaging stop.

6. A method of attaching a towing head to a vehicle, said method comprising the steps of:
providing a tow pin;
providing a first member including a channel;
providing a second member including a lip which communicates with said channel;
providing a third member pivotally attached to the second member:
moving said first and second members to contact the tow pin;
pivoting said second member in a first direction enabling the tow pin to be placed fully within the channel;
pivoting the second member in a second direction causing the tow pin to be captured between the channel and the lip; and
lifting the third member upward to lock the towing head to the tow pin.

7. A method, as claimed in claim 6, further including the step of:
pivoting the second member in the first and second directions by means of a handle.

8. A method, as claimed in claim 7, further including the step of:
biasing the pivoting of the second member by a spring.

9. A method, as claimed in claim 8, further including the step of:
varying the force of said biasing step.

10. A towing head for attachment of a tow bar assembly to a tow pin of a vehicle, said towing head comprising:
a first stationary means for connecting including a channel formed thereon for receiving the tow pin, said first means further including a groove spaced from said channel;
a second pivotal means for connecting having first and second ends said first end pivotally attached to said first connecting means, said second connecting means further having a lip which communicates with said channel; and
a pivot block connected to said second connecting means at said second end thereof, said pivot block including an engaging stop attached thereto, said engaging stop being positionable to lock the tow pin within said channel by insertion of said engaging stop within said groove wherein said lip intersects said channel preventing removal of the tow pin.

11. A towing head, as claimed in claim 10, further including:
a spring connected to said second connecting means and urging said second connecting means so that said lip interferes with said channel to block removal of the tow pin.

12. A towing head, as claimed in claim 10, further including:
a handle connected to said pivot block enabling said engaging stop to be raised or lowered by manipulating said handle.

13. A towing head, as claimed in claim 11, further including:
an adjustment means communicating with said spring to enable the force of said spring to be adjusted.

14. A towing head for attachment of a tow pin to a vehicle, said towing head comprising:
a first member including a channel formed thereon;
a second member pivotally attached to said first member and having a channel formed thereon wherein said second member is positionable so that said channels form an opening through which the tow pin may pass, or said second member being positionable so that said second member interferes with said opening to block removal of the tow pin from within said opening;
a third member pivotally attached to said second member, said third member including an engaging stop which communicates with said first member to place said towing head in a locked, partially locked, or unlocked position; and
a spring interconnecting said second member and said third member to urge said second member so that it interferes with said opening and to urge said third member away from said second member.

15. A towing head for attachment to a tow pin on a wheel assembly of a vehicle, said towing head comprising:
a first stationary member including a channel formed thereon;
a second pivotal member having first and second ends, said second pivotal member attached to said first stationary member at said first end thereof, said second pivotal member being pivotal with respect to said first stationary member about said first end, said second pivotal member further having a lip which communicates with said channel;
a third pivotal member attached to said second pivotal member at said second end thereof, said third member being pivotal about said second member at said second end thereof; and
a spring interconnecting said second pivotal member and said third pivotal member, and to urge said second pivotal member to interfere with said channel.

16. A towing head, as claimed in claim 15, wherein:
said second pivotal member secures the tow pin within said channel by rotation in a clockwise direction, said tow pin being removable from said channel by rotation of said second pivotal member in a counter-clockwise direction, and said third pivotal member being rotated in a clockwise direction to lock the tow pin within said channel and being rotated in a counter-clockwise direction to unlock.

17. A towing head, as claimed in claim 15, wherein:
said spring urges said second and third pivotal members apart from one another.

18. A towing head, as claimed in claim 15, further including:
an adjustment screw communicating with said spring to enable the force of said spring to be adjusted.

19. A towing head, as claimed in claim 15, further including:

a handle connected to said third pivotal member enabling said third pivotal member to be brought into and out of selective engagement with said first stationary member by manipulating said handle to lock or unlock the towing pin within said channel.

20. A towing head, as claimed in claim 15, further including:

an engaging stop attached to said third pivotal member for selective engagement with said first stationary member to lock or unlock the tow pin in said channel.

21. A towing head, as claimed in claim 20, wherein:

said first stationary member includes a groove for receiving said engaging stop.

* * * * *